UNITED STATES PATENT OFFICE.

THOMAS C. RICE, OF WORCESTER, MASSACHUSETTS.

IMPROVEMENT IN PAINT FOR ROOFS.

Specification forming part of Letters Patent No. 104,648, dated June 21, 1870.

*To all whom it may concern:*

Be it known that I, THOMAS C. RICE, of the city and county of Worcester and Commonwealth of Massachusetts, have invented certain new and useful Improvements in Paint for Shingled Roofs and for other purposes; and I do hereby declare the following to be a full, clear, and exact description of the same.

To enable those skilled in the art to which my invention belongs to make and use the same, I will proceed to describe it more in detail.

My improved paint is designed more particularly for shingle roofs, and is made as follows: First, take ground rosin and powdered slate, in the proportions of one pound of rosin to ten pounds of slate, and make the same into a paste with water, which paste is then dried and pulverized.

To prepare the paint for use, take, say, ten pounds of the powder made as above, and mix the same with one gallon of coal-tar or liquid asphaltum, adding one gallon of sal-soda in solution, and naphtha, petroleum-oil, or spirits of turpentine, one gallon, or enough to reduce the mixture to a consistency suitable for working under the brush.

The advantage of putting together rosin and slate as above is, that, in combination, they resist the absorption of water, and when mixed with coal-tar or liquid asphaltum they remain united and retain the power of resisting the absorption of moisture after the liquid portion of the paint has suffered from the effect of the weather.

By adding water I am able to use a greater proportion of the dry material, and as the water evaporates the painted surface appears without gloss and of the color of dark slate.

The soda aids in uniting the materials.

Having described my improved paint, what I claim therein as new and of my invention, and desire to secure by Letters Patent, is—

A paint composed of the materials and in the proportions substantially as above described.

THOS. C. RICE.

Witnesses:
 THOS. H. DODGE,
 ALBERT E. PEIRCE.